United States Patent
Lhotak et al.

(10) Patent No.: US 9,458,902 B2
(45) Date of Patent: Oct. 4, 2016

(54) MOVABLE BARRIER HYDRAULIC BRAKING

(71) Applicant: The Chamberlain Group, Inc., Elmhurst, IL (US)

(72) Inventors: Roger William Lhotak, Hanover Park, IL (US); Brian Roy Skotty, Elmhurst, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 45 days.

(21) Appl. No.: 14/336,077

(22) Filed: Jul. 21, 2014

(65) Prior Publication Data

US 2014/0325978 A1 Nov. 6, 2014

Related U.S. Application Data

(62) Division of application No. 13/330,009, filed on Dec. 19, 2011, now Pat. No. 8,783,426.

(51) Int. Cl.
| | |
|---|---|
| F16D 65/14 | (2006.01) |
| E06B 9/70 | (2006.01) |
| E06B 9/80 | (2006.01) |
| F16D 55/28 | (2006.01) |
| E05F 15/50 | (2015.01) |
| F16D 121/04 | (2012.01) |
| F16D 125/02 | (2012.01) |

(52) U.S. Cl.
CPC ............... *F16D 65/14* (2013.01); *E05F 15/50* (2015.01); *E06B 9/70* (2013.01); *E06B 9/80* (2013.01); *F16D 55/28* (2013.01); *E05Y 2900/00* (2013.01); *E05Y 2900/106* (2013.01); *E06B 2009/808* (2013.01); *F16D 2121/04* (2013.01); *F16D 2125/023* (2013.01); *Y10T 29/49229* (2015.01); *Y10T 29/49236* (2015.01)

(58) Field of Classification Search
CPC ............ E06B 9/70; E06B 9/80; E05F 65/14; E05F 65/28; E05F 15/02; E05F 15/10; F16D 2121/04
USPC .............. 188/151 R, 294, 295, 106 F; 49/358
See application file for complete search history.

(56) References Cited

U.S. PATENT DOCUMENTS

| | | | | |
|---|---|---|---|---|
| 1,886,624 | A | * | 11/1932 | Barton .................... F16D 31/02 188/295 |
| 2,670,065 | A | | 2/1954 | Stevens, Jr. |
| 2,880,825 | A | * | 4/1959 | Porter ..................... F16D 57/06 188/295 |
| 4,036,329 | A | * | 7/1977 | Anderson ............. F16D 55/224 188/72.7 |
| 4,371,058 | A | | 2/1983 | Holley |
| 4,941,320 | A | | 7/1990 | Kersten |

(Continued)

OTHER PUBLICATIONS

Wikipedia definition of "hydraulic brakes" listed in http://en.wikipedia.org/wiki/Hydraulic.sub.--Brake; known as of Aug. 18, 2010.

*Primary Examiner* — Christopher Schwartz
(74) *Attorney, Agent, or Firm* — Fitch Even Tabin & Flannery LLP

(57) ABSTRACT

A hydraulic brake apparatus, a movable barrier apparatus, a hydraulic brake kit, a method of stopping movement of a movable barrier, and a method installing a hydraulic brake assembly are described herein. A selectively operable piston mechanism converts rotation of a drive shaft of a movable barrier into hydraulic pressure used to operate a brake configured to stop movement of the drive shaft.

28 Claims, 10 Drawing Sheets

(56) References Cited

U.S. PATENT DOCUMENTS

| | | | | |
|---|---|---|---|---|
| 6,484,784 B1 * | 11/2002 | Weik, III | | E05F 1/006 160/7 |
| 6,929,103 B2 * | 8/2005 | Cannata | | B60T 1/093 188/294 |
| 8,783,426 B2 * | 7/2014 | Lhotak | | E06B 9/70 188/151 R |
| 2009/0116903 A1 * | 5/2009 | Causey | | E01F 13/06 404/6 |
| 2013/0064692 A1 * | 3/2013 | Sechler | | B60T 17/02 417/313 |

* cited by examiner

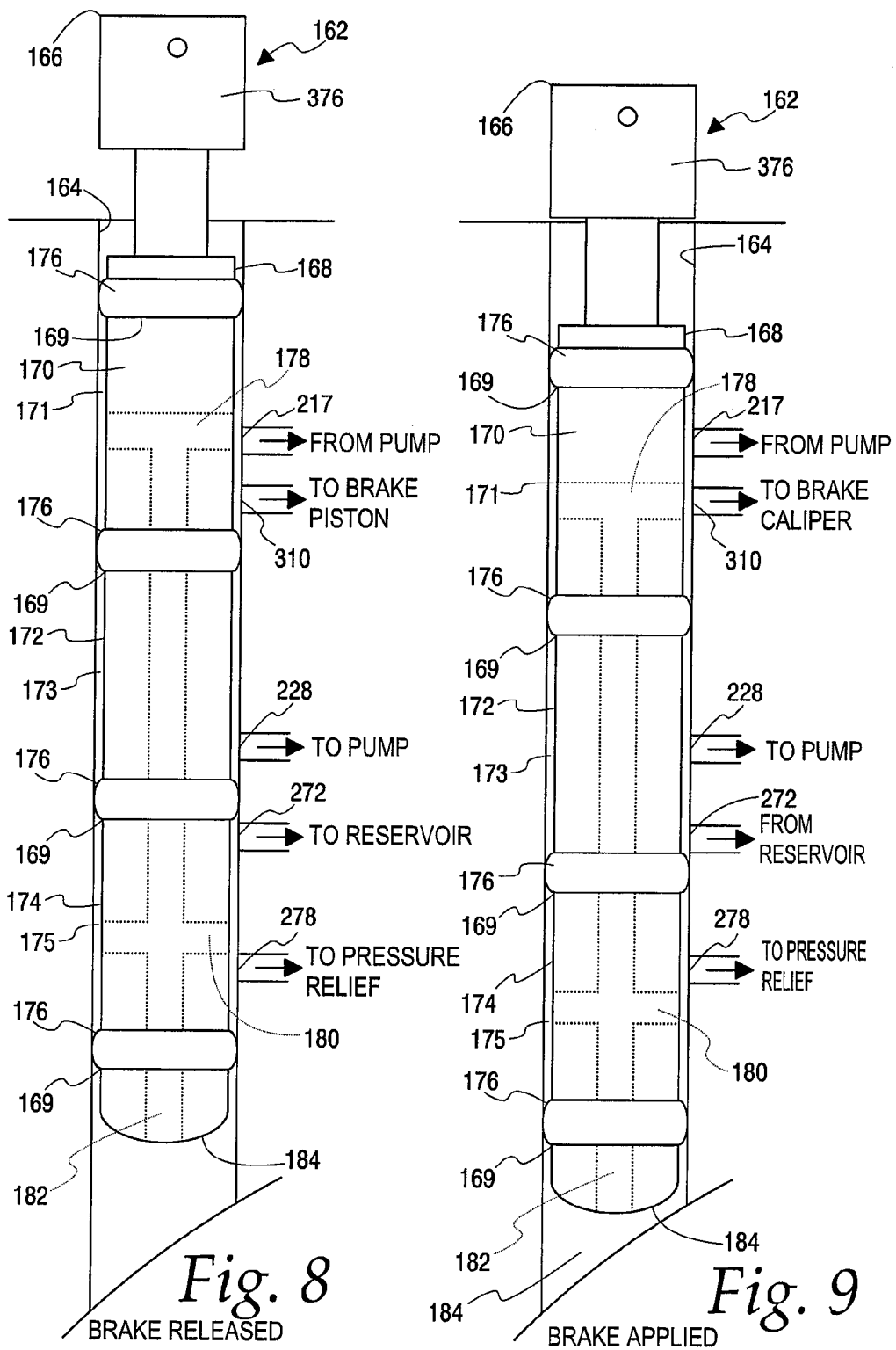

```
                                                              400
┌─────────────────────────────────────────────────────────────────┐
│ CONVERT ROTATIONAL MOVEMENT OF A DRIVE SHAFT INTO LINEAR        │
│ MOVEMENT OF A PISTON WITHIN A PISTON PUMP                   402 │
└─────────────────────────────────────────────────────────────────┘
┌─────────────────────────────────────────────────────────────────┐
│ CREATE PRESSURE WITHIN A HYDRAULIC LINE FLUIDLY CONNECTED TO    │
│ THE PISTON PUMP BY OPERATION OF THE PISTON PUMP             404 │
└─────────────────────────────────────────────────────────────────┘
┌─────────────────────────────────────────────────────────────────┐
│ WITH THE PRESSURE, DRIVE A BRAKE PAD INTO FRICTIONAL            │
│ ENGAGEMENT WITH A BRAKE MEMBER COUPLED TO THE DRIVE SHAFT   406 │
└─────────────────────────────────────────────────────────────────┘
```

*Fig. 11*

```
                                                              500
┌─────────────────────────────────────────────────────────────────┐
│ COUPLE A CAM TO A DRIVE SHAFT OF A MOVABLE BARRIER          502 │
└─────────────────────────────────────────────────────────────────┘
┌─────────────────────────────────────────────────────────────────┐
│ MOUNT A PISTON PUMP ADJACENT TO THE DRIVE SHAFT FOR SELECTIVE   │
│ ENGAGEMENT OF THE CAM                                       504 │
└─────────────────────────────────────────────────────────────────┘
┌─────────────────────────────────────────────────────────────────┐
│ COUPLE A BRAKE MEMBER TO THE DRIVE SHAFT OF THE MOVABLE         │
│ BARRIER                                                     506 │
└─────────────────────────────────────────────────────────────────┘
┌─────────────────────────────────────────────────────────────────┐
│ MOUNT A BRAKE CALIPER ASSEMBLY HAVING A BRAKE PAD ADJACENT TO   │
│ THE BRAKE MEMBER FOR SELECTIVE ENGAGEMENT OF THE BRAKE MEMBER   │
│ BY THE BRAKE PAD                                            508 │
└─────────────────────────────────────────────────────────────────┘
┌─────────────────────────────────────────────────────────────────┐
│ MOUNT A BRAKE PISTON MECHANISM ADJACENT TO THE BRAKE CALIPER    │
│ ASSEMBLY, THE BRAKE PISTON MECHANISM CONFIGURED TO SELECTIVELY  │
│ SHIFT THE BRAKE PAD INTO ENGAGEMENT WITH THE BRAKE MEMBER   510 │
└─────────────────────────────────────────────────────────────────┘
┌─────────────────────────────────────────────────────────────────┐
│ ESTABLISH A HYDRAULIC LINE BETWEEN THE PISTON PUMP AND THE      │
│ BRAKE PISTON MECHANISM                                      512 │
└─────────────────────────────────────────────────────────────────┘
┌─────────────────────────────────────────────────────────────────┐
┊ COUPLE A CONTROL DEVICE TO THE PISTON PUMP TO CONTROL SELECTIVE ┊
┊ ENGAGEMENT BETWEEN THE PISTON PUMP AND THE CAM              514 ┊
└─────────────────────────────────────────────────────────────────┘
```

*Fig. 12*

MOVABLE BARRIER HYDRAULIC BRAKING

RELATED APPLICATION

This is a divisional application of U.S. patent application Ser. No. 13/330,009, filed Dec. 19, 2011, the contents of which are incorporated by reference in their entirety herein.

FIELD

This invention relates generally to movable barriers and, more particularly, to braking assemblies for movable barriers.

BACKGROUND

Movable barriers known in the art can include braking systems. These braking systems operate to stop and hold a movable barrier when commanded or configured to do so. One type of braking system is an electromechanical brake system. An electromechanical brake system can be configured to release when power is removed from the system or engage when power is removed, for example, to stop a barrier from dropping out of control due to the loss in power. In one example system, a barrier is raised or rolled up to open a pathway and lowered or unrolled to close the pathway. Uncontrolled dropping of such a barrier can result in damage to the barrier or surrounding structures. While an electromechanical braking system is satisfactory for many purposes, the components can be relatively large to provide sufficient braking capacity, which requires larger housings for movable barrier operators leading to increased manufacturing, packaging, and transportation costs.

SUMMARY

A brake apparatus for a movable barrier is provided that utilizes the rotation of a movable barrier operator motor shaft or drive shaft to selectively apply a braking force to impede the rotation thereof. In one form, a hydraulic piston mechanism is mounted radially adjacent to the shaft to selectively engage a cam mounted to the shaft. A brake mechanism is fluidly coupled to the hydraulic piston, such that the brake mechanism is configured to impede rotation of the shaft in response to the hydraulic piston engaging the cam.

In another form, a movable barrier operator is provided having a housing and a motor at least partially disposed within the housing. The motor includes a motor shaft and is configured to drive a movable barrier between open and closed positions. The operator further includes a hydraulic brake assembly that is at least partially received within the housing and configured to selectively engage the motor shaft to thereby inhibit rotation of the motor shaft and movement of the movable barrier.

The hydraulic brake apparatus can further take the form of a kit for a movable barrier system including a movable barrier operator configured to drive a movable barrier between open and closed positions. An example kit includes a cam configured to be mounted to a shaft of the motor or the movable barrier to rotate therewith. A hydraulic piston pump in the kit is configured to be mounted radially outward of the shaft to selectively engage the cam. The hydraulic piston pump is also configured to be operably coupled to a brake mechanism included in the kit such that the piston pump engaging the cam causes the brake mechanism to engage the shaft to thereby impede rotation of the shaft.

By another approach, an example hydraulic brake device for a movable barrier includes a hydraulic block housing that includes hydraulic lines and cylinders for the hydraulic components. The cylinders can be configured to be a piston pump, a reservoir/accumulator, a brake piston, and a spool valve. The hydraulic lines fluidly connect the cylinders with the cylinder of the spool valve fluidly positioned intermediate of the piston pump and the reservoir. The spool valve includes a spool member received within the cylinder thereof that is shiftable between first and second positions. In the first position, the spool valve impedes fluid flow between the piston pump and the reservoir, and in the second position, the spool valve allows fluid flow between the pressurized reservoir and the piston pump. The example hydraulic brake device further includes a brake mechanism with a shiftable brake pad, a first piston for the piston pump, and a second piston for the brake piston. The first piston is configured to be driven to an extended position by pressure within the reservoir when the spool member is shifted to the second position, so that the first piston can be engaged and driven by a cam to a compressed position. By the compression, a fluid line connecting the piston pump to the brake piston is pressurized. The second piston within the brake piston is driven by the pressure in the line to an extended position to thereby shift the brake pad of the brake member to engage with a rotor.

A method of impeding rotation of a drive shaft of a movable barrier or a motor shaft of a movable barrier operator is provided to stop movement of a movable barrier coupled thereto. One example method includes converting rotational movement of the shaft into linear movement of a piston within a piston pump. The operation of the piston pump creates pressure within a hydraulic line fluidly connected to the piston pump. The pressure then drives a brake pad into frictional engagement with a brake member coupled to the shaft. By one approach, the pressure drives a caliper piston to an extended position to engage and drive the brake pad.

A method of installing a hydraulic brake assembly for a movable barrier is also provided. One example method includes coupling a cam to a drive shaft of a movable barrier and mounting a piston pump adjacent to the drive shaft for selective engagement of the cam. A brake member, such as a rotor, is also coupled to the drive shaft. The example method further includes mounting a brake caliper assembly so that a brake pad thereof is positioned adjacent to the brake member for selective engagement of the brake member by the brake pad. A brake piston mechanism, with an established hydraulic line with the piston pump, is mounted adjacent to the brake caliper assembly and is configured to selectively shift the brake pad into engagement with the brake member.

BRIEF DESCRIPTION OF THE DRAWINGS

The above needs are at least partially met through provision of the movable barrier hydraulic braking described in the following detailed description, particularly when studied in conjunction with the drawings, wherein:

FIG. 8 is a cross-sectional view of an example spool valve for the hydraulic housing of FIG. 5 showing the spool valve member in an off position;

FIG. 9 is a cross-sectional view of the spool valve of FIG. 8 showing the spool valve member in an operative position;

FIG. 11 is a flowchart for an example operation of a hydraulic braking assembly in accordance with various embodiments of the invention; and FIG. 12 is a flowchart for an example installation of a hydraulic braking assembly in accordance with various embodiments of the invention.

Figure 1:
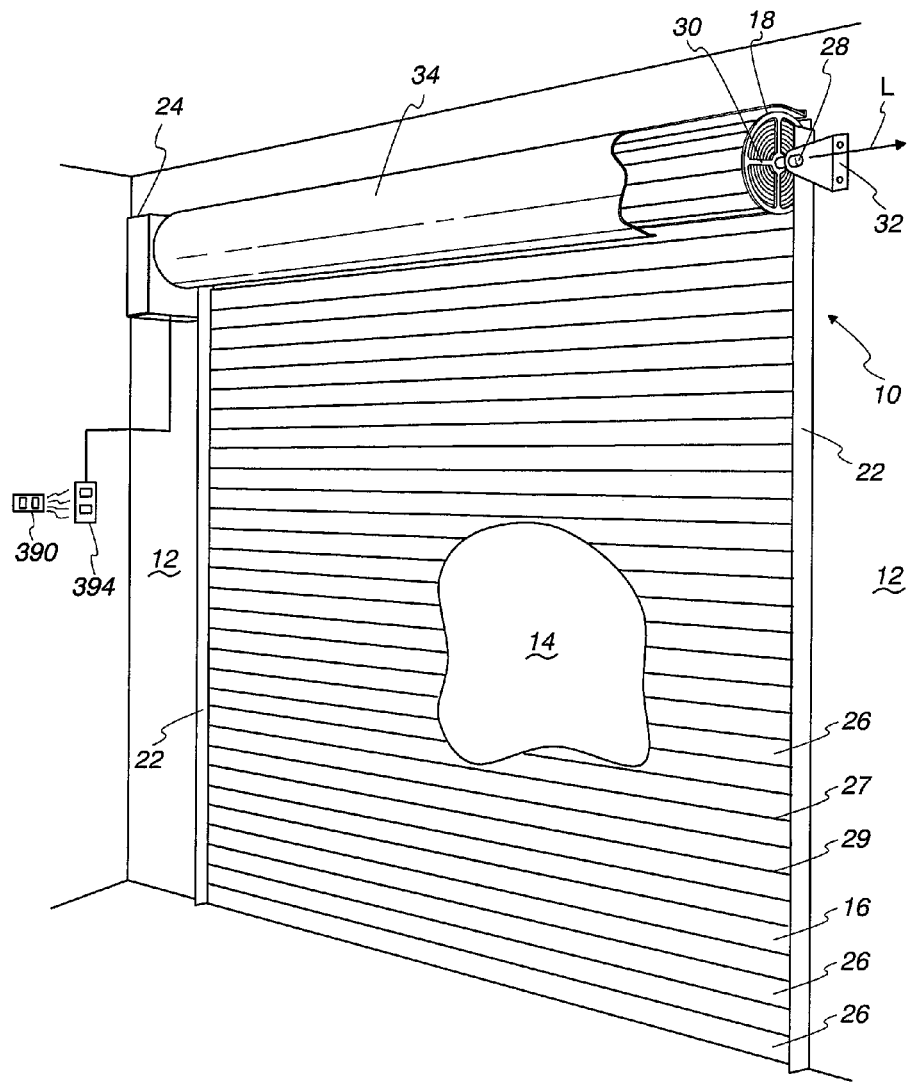
FIG. 1 is a perspective view of a portion of a structure defining a barrier opening therein having a rolling door assembly mounted adjacent thereto in a closed position.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

A hydraulic braking apparatus is provided that utilizes the rotation of a motor or movable barrier drive shaft to impede rotation of the shaft. This configuration can be utilized to apply an increasing braking force with continued rotation of the shaft. The hydraulic braking apparatus is configured to selectively engage the shaft so that a movable barrier operator can function normally to drive a movable barrier between open and closed positions. Then, when stopping movement of the movable barrier is desired, the hydraulic braking apparatus can selectively engage the shaft. By the illustrated approach, a cam is mounted to the shaft and a piston pump is mounted radially adjacent to the cam. When braking is desired, a piston of the piston pump is forced to an extended position by pressurized fluid from the reservoir in a path of rotation of the cam so that the cam, which is powered by the motor drive shaft, drives the piston to a compressed position. Pressure created in hydraulic fluid by the piston pump then causes a braking device to engage and impede rotation of the shaft.

So configured, the energy of the moving barrier is redirected to brake and stop the barrier through the hydraulic brake. A controller can cause actuation of a portion of hydraulic brake to cause the brake apparatus to operate. By engaging a cam rotating with the movable barrier drive shaft, the movable barrier's motion (through the drive shaft) powers the brake by compressing a hydraulic fluid, which in turn drives a brake apparatus to engage the drive shaft. Such a brake can be made to have a small size and readily incorporated into the movable barrier driving apparatus. Moreover, the brake is not reliant upon an outside power source to engage or stop the barrier such that the barrier movement can be impeded in a variety of applications. These and other advantages will be apparent in view of the following description.

Referring now to the drawings and especially FIG. 1, an example rolling door assembly 10 is illustrated. The rolling door assembly 10 is configured to be mounted to a wall or substrate 12 adjacent to an opening 14 to provide selective access therethrough. The rolling door assembly 10 includes, at least in part, a rolling door 16 coupled to a drum 18 at a top portion of the rolling door 16 and guide rails or tracks 22 to direct movement of the rolling door 16 between open and closed positions. The drum 18 can be generally cylindrical and include a circumferential perimeter and a central longitudinal axis L around which the drum 18 rotates to direct movement of the rolling door 16. So configured, the rolling door 16 is movable to any position between a closed position unrolled from the drum 18 and covering the opening 14 and a stored or raised position rolled around the drum 18 and exposing the opening 14. Movement of the rolling door 16 can be driven by, for example, a movable barrier operator 24 or a manually-operated crank. Such an operator can be controlled by typical devices, including a push button control unit, which can include an electronic controller and a keypad, or a remote control device that is configured to wirelessly send command signals to a receiver in the operator.

More particularly, the rolling door 16, in this example, includes a series of rectangular slats or panels 26. Each slat 26 rotatably couples to adjacent slats along top and bottom edge portions 27, 29 thereof to form the main faces of the rolling door 16. As discussed above, the rolling door 16 couples to the drum 18 along its top edge portion by suitable attachment methods, such as hardware, welding, or the like. By one approach, the drum 18 is hollow and connected to a shaft 28 by a coupling member 30. The shaft 28 can be a live shaft that, as known in the art, rotates along with the drum 18, which can utilize a bearing internal to an attached operator or crank. The shaft 28 can alternatively be a dead shaft that, as known in the art, remains stationary during movement of drum 18 and uses an external bearing between the shaft 28 and the drum 18. The shaft 28 couples to mounting brackets 32 that attach to the wall 12 by conventional methods. The mounting brackets 32 restrict the drum 18 from moving radially along radii extending out and away from the longitudinal axis L. Similarly, the guide rails 22 mount to the wall 12 on adjacent sides of the opening 14 in a conventional manner. The rolling door assembly 10 may further include a hood or cover 34 that at least partially surrounds and preferably encloses the drum 18, and any portion of the rolling door 16 wrapped therearound, therein.

The hood 34 conceals the drum 18 and the portions of the rolling door 16 wrapped around the drum 18 and provides protection for the rolling door assembly 10.

Figure 2:
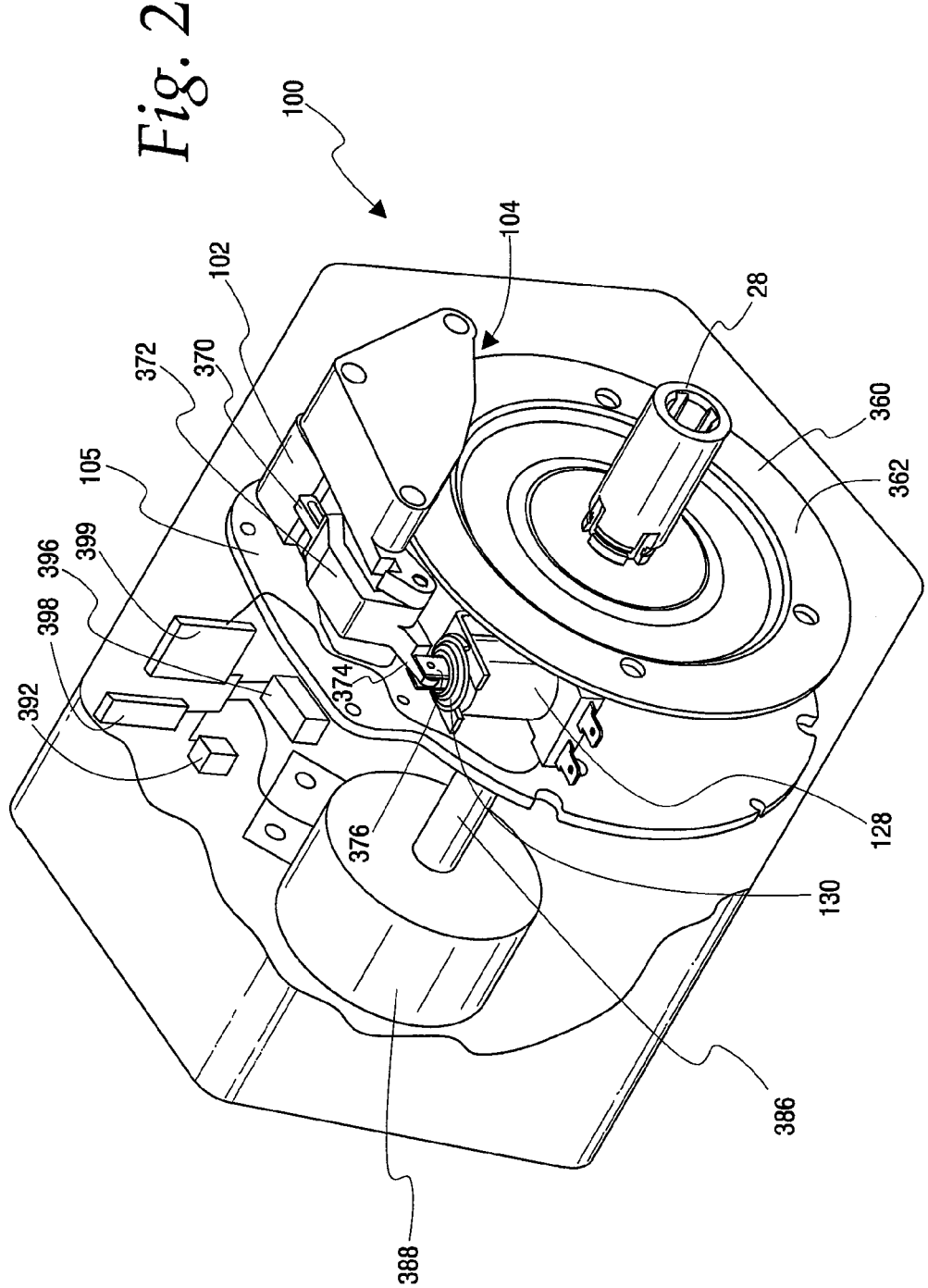
FIG. 2 is a perspective view of components of a movable barrier operator having a hydraulic braking apparatus according to various embodiments of the invention disposed therein shown through a cutaway of a housing of the operator.

As shown in FIG. 2, an example hydraulic braking apparatus 100 for the above described movable barrier system includes a hydraulic housing 102 with a brake caliper device 104 mounted thereto. The housing 102 includes all hydraulic lines, chambers, and cylinders necessary for the hydraulic operations of the hydraulic braking apparatus 100 therein. Moreover, the hydraulic operations of the housing 102 are configured, in part, to engage the brake caliper device 104 to drive operation thereof for impeding rotation of the shaft. The housing 102 is mounted to a bracket 105 that is configured to be installed so that the shaft 28 passes through a central opening 106 (FIG. 4) therein. As such, the hydraulic braking apparatus 100 is positioned radially adjacent to and outward from the shaft 28. It will be understood that the shaft 28 can refer to a drive shaft for the movable barrier 16 or a motor shaft.

Figure 6:
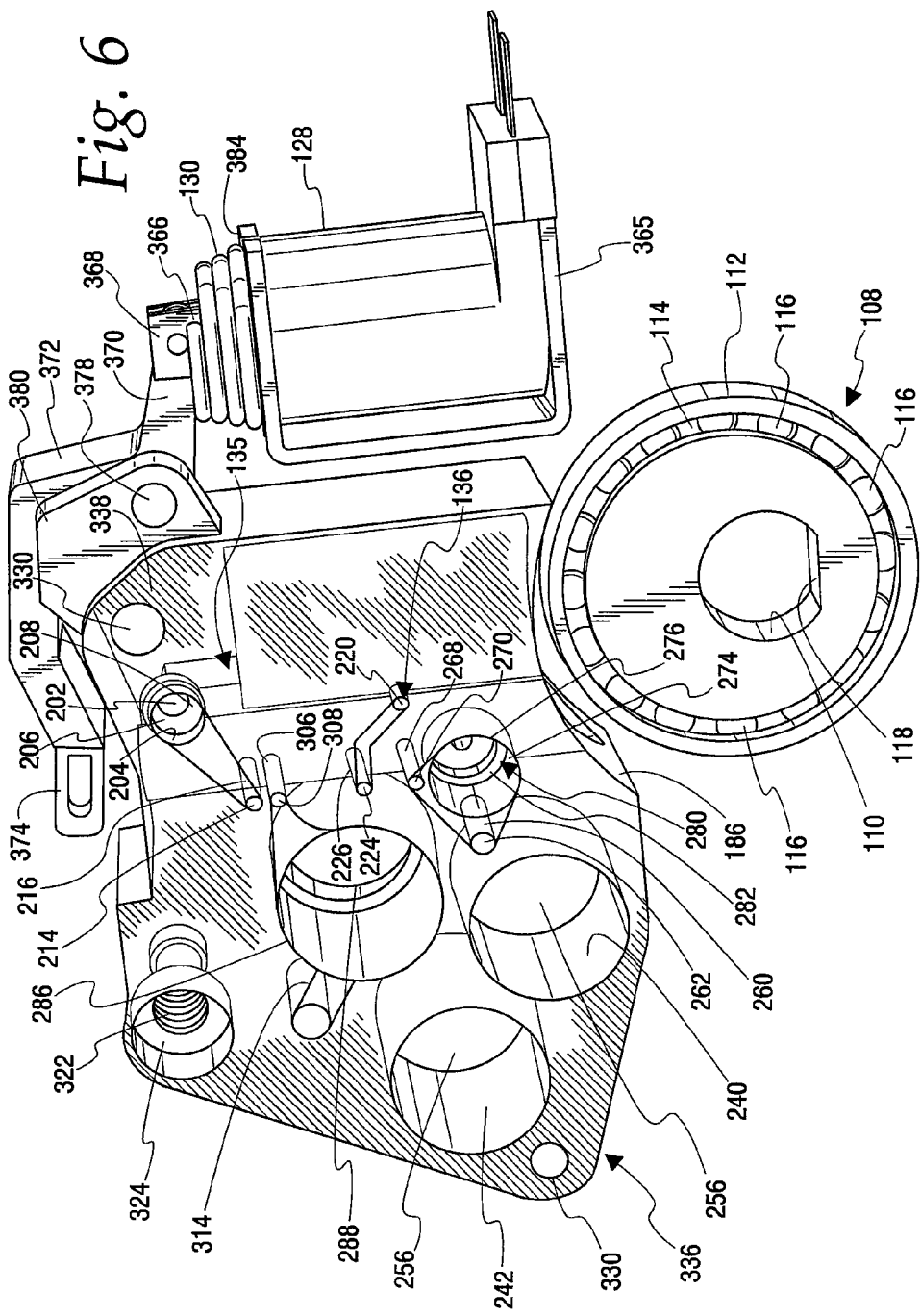
FIG. 6 is a cross-sectional view of the hydraulic housing of FIG. 5 taken along the line 6-6 in FIG. 5 having cross-hatching removed to clearly show the hydraulic lines and chambers therein.

As shown in FIG. 6, a cam 108 is mounted to the shaft 28 radially inward of the hydraulic braking apparatus 100 so as to rotate therewith. The cam 108 includes a bore 110 therethrough that is positioned off-center so that with mounting of the cam 108 to the shaft 28, the cam 108 has an irregular path of rotation. If desired, the cam 108 can include a bearing 112, such as a roller bearing or the like, mounted to a radially outward portion of the cam 108 so that friction with components interacting with the cam 108, and the wear associated therewith, is minimized. As shown, the cam 108 includes a radial, outwardly facing trough 114 extending therearound for reception of ball bearings 116 of the roller bearing 112. Preferably, the shaft 28 includes a flattened radial surface portion 118 and the cam opening 110 has a similarly configured flattened portion 120, so that the cam 108 rotates with the shaft 28 without slippage or additional hardware or other attachment methods.

Figure 7:
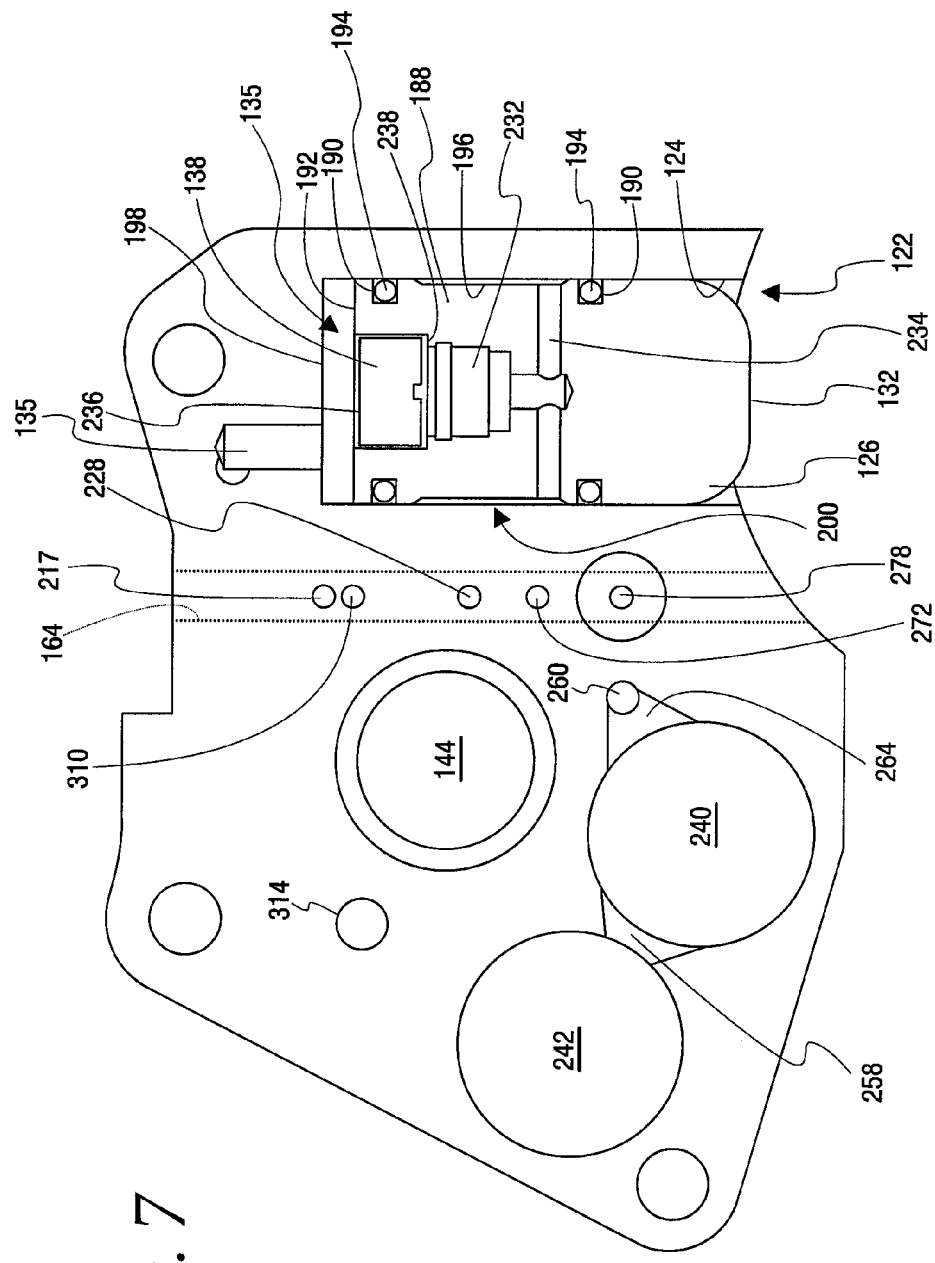
FIG. 7 is a cross-sectional view of the hydraulic housing of FIG. 5 taken along the line 7-7 in FIG. 5 showing detail of the piston pump.

Referring now to the diagrammatic view of the hydraulic braking apparatus 100 shown in FIG. 3, the operation will first be described followed by details of the structure of each component. A piston pump 122 includes a cylinder or chamber 124 and a piston member 126 slidingly disposed therein. The piston member 126 shifts between an extended position where the piston member 126 extends partially out of the chamber 124 and a compressed position where the piston member 126 is fully received within the chamber 124. A control device, such as a solenoid 128, return spring 130, or the like, controls operation of the piston pump 122 and is configured to drive or cause the piston member 126 to be driven to the extended position. The piston pump 122 is mounted radially outward of the shaft 28 and the cam 108 mounted thereto so that with the piston member 126 in the extended position, an end portion 132 (FIG. 7) of the piston member 126 is located within a path of rotation of the cam 108. So configured, when operation of the hydraulic braking apparatus 100 is desired, the control device 128 drives or causes the piston member 126 to be driven to the extended position where the cam 108 subsequently impacts the end portion 132 (FIG. 7) thereof and drives the piston member 122 to the compressed position.

The hydraulic braking apparatus 100 utilizes hydraulic fluid 134 to transfer forces between its various components. As such, the piston pump 122 includes an outlet 135 and an inlet 136 through which the piston pump 122 expels and receives the hydraulic fluid. Check valves 138, or one-way valves, are mounted in-line with each of the outlet 135 and inlet 136 to control fluid flow therethrough. Utilizing this structure, the check valves 138 allow fluid to flow out of the piston pump 122 through the outlet 135 and in through the inlet 136, but restrict the opposite flow.

A caliper piston 140 fluidly connects to the outlet 135 of the piston pump 122 at a caliper piston line 142 to be driven thereby. The caliper piston 140 includes a chamber or cylinder 144 and a piston member 146 slidingly disposed therein to be driven between an extended braking position and a retracted rest position. As the pump piston member 126 is driven to the compressed position, it pressurizes the hydraulic system causing the hydraulic fluid within the lines connecting the piston pump 122 to the caliper piston 140 to exert pressure on the piston member 146 of the caliper piston 140. With enough force, the piston member 146 is driven to the extended position where it engages the brake caliper 104. The brake caliper 104 then frictionally impedes rotation of the shaft 28.

The hydraulic brake apparatus 100 also includes a fluid reservoir or accumulator 148 selectively fluidly coupled to the outlet 135 and the inlet 136 of the piston pump 122. The fluid reservoir 148 can be configured to hold excess hydraulic fluid to accommodate volume changes in the system and can aid in separation of air from the fluid. Moreover, as an accumulator, the reservoir 148 is configured to store energy within the hydraulic system. This can be achieved using a spring, a pressurized gas, or the like, and/or utilizing a piston or a bladder, for example. The check valves 138, in combination with the solenoid 128 (or return spring 130, in the case of loss of energy), allow for the preservation of energy in the accumulator 148 by controlling and restricting fluid flow through the system. This pressurized fluid can then be utilized to start operation of the hydraulic brake apparatus 100 by driving the piston pump 122 to the extended position.

A pressure relief valve 150 can be installed between the piston pump outlet 135 and/or the reservoir 148 and can be configured to prevent overloading and/or rupture of the hydraulic lines or seals or shock to the barrier system. The valve 150 can also be configured to maintain a small positive pressure to exclude moisture and contamination.

Figure 3:
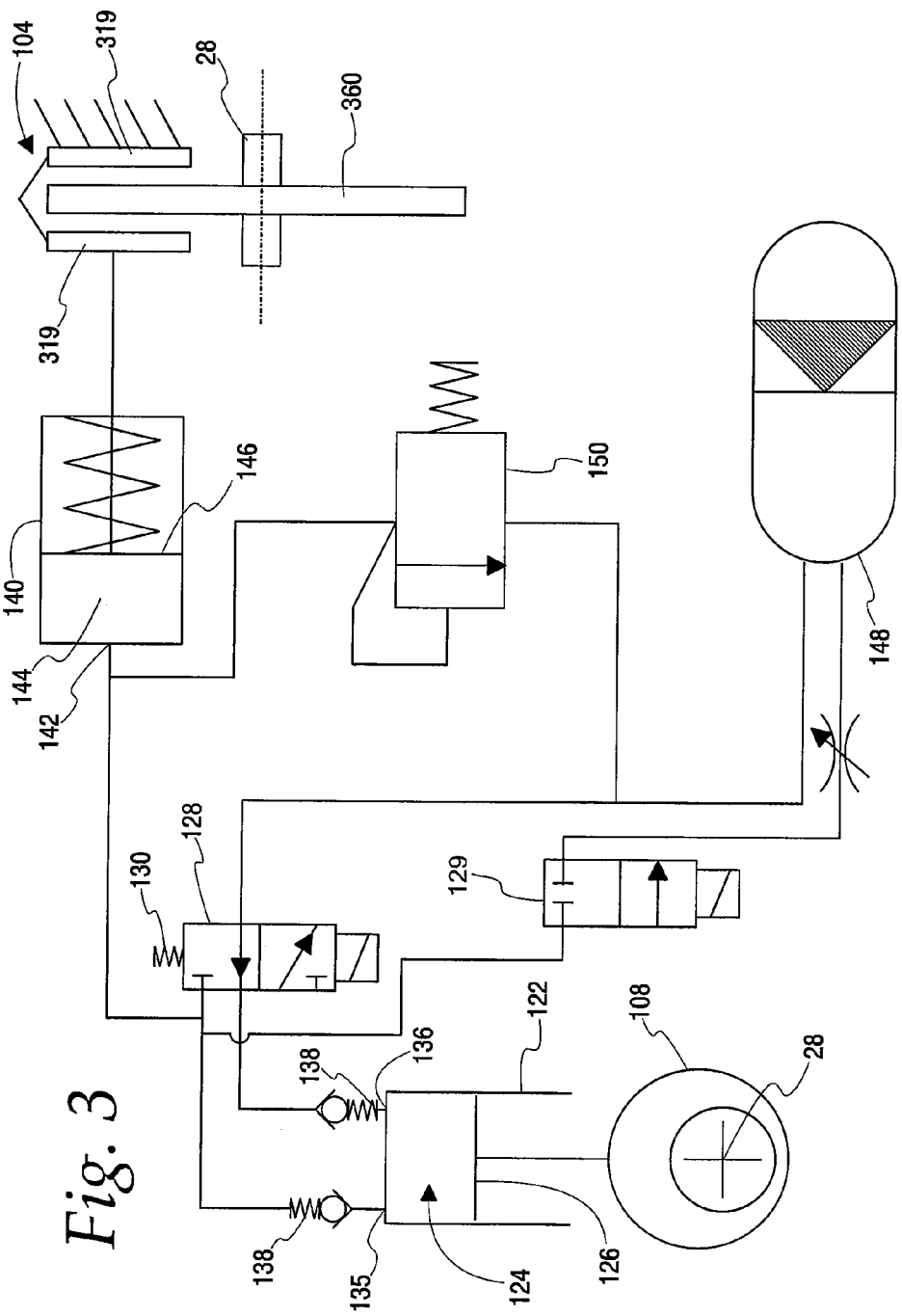
FIG. 3 is a diagrammatic view of a hydraulic braking apparatus for a movable barrier according to various embodiments of the invention.

The solenoid 128 is illustrated in FIG. 3 as stacked boxes illustrating connections between the various lines of the hydraulic braking apparatus 100. The upper box corresponds to the solenoid 128 being in an operative position that connects the reservoir 148 to the pump inlet 136 so that the pressurized fluid in the reservoir 148 can drive the piston pump 122 to the extended position. The lower box corresponds to the solenoid 128 being in an off position that connects the pump outlet 135 to the reservoir 148 and disengages the reservoir 148 from the pump inlet 136.

As shown in FIG. 3, the hydraulic braking apparatus 100 can also be configured to operate in a fire door system. Such a fire system is configured to shut a barrier in response to detection of a fire or other emergency. This can advantageously restrict the spread of fire or other undesired material. In order to operate in such a way, the hydraulic braking apparatus 100 includes an alarm control device 129, such as a solenoid or a spring. The alarm solenoid 129 controls fluid flow between the piston pump outlet 135 and the reservoir 148. The alarm solenoid 129 is illustrated as in FIG. 3 as stacked boxes showing the two operational states of the solenoid. In a normal operating position, corresponding to non-emergency situations, the pump outlet 135 and the reservoir 148 are disconnected. In the engaged position, corresponding to a fire alarm or other emergency situation, the pump outlet 135 is connected to the reservoir 148 so that any pressure that is causing the caliper piston 140 to engage the brake caliper device 104 is released and the hydraulic braking apparatus 100 no longer impedes movement of the barrier 16. As such, the barrier 16 is allowed to move to the closed position covering its associated barrier opening Having described the general operation of the hydraulic braking apparatus 100 above, the structural detail of an example apparatus 100 will now be described with reference to FIGS. 4-10. As shown, the housing 102 includes all of the hydraulic lines, passageways, and chambers/cylinders necessary for operation of the hydraulic braking apparatus 100. The housing 102 includes a front surface 152, a rear surface 154, a top surface 156, a bottom surface 158, and side surfaces 160. It will be understood that directional orientation included in the description is for clarity purposes only and that the hydraulic braking apparatus 100 can be mounted radially outward from the shaft 28 in any suitable orientation with respect to the shaft 28.

In addition to the check valves 138 discussed above, the hydraulic braking apparatus 100 utilizes a spool valve 162 that controls operation by controlling hydraulic fluid flow between the various brake components. The spool valve 162 includes a generally cylindrical bore 164 through the housing 102 extending from the top surface 156 to the bottom surface 158 thereof. The pump inlet 136, the pump outlet 135, the caliper piston 140, the reservoir 148, and the pressure relief valve 150 fluidly connect to the bore 164 so that the valve 162 can control the fluid flow therebetween. A spool member 166 having a generally cylindrical side surface 168 is slidingly disposed within the spool bore 164. The spool member 166 includes four annular grooves 169 extending therearound generally transverse to the longitudinal length thereof that divide the spool member 166 into first, second, and third sections 170, 172, 174 (FIGS. 8 and 9). The spool member side surface 168 in each of the sections 170, 172, 174 is recessed or concave with respect to the grooves 169, so that when o-rings 176 are disposed in the grooves 169, the o-rings 176 sealingly engage the bore 164 to create first, second, and third volumes 171, 173, 175 (FIG. 8) between the bore 164 and the spool member 166.

Moreover, the spool member 166 includes a first bore 178 extending transversely to the spool longitudinal axis through the first section 170 thereof and a third bore 180 extending transversely to the spool longitudinal axis through the third section 174 thereof. A central longitudinal bore 182 extends from a bottom surface 184 of the spool member 166 past the third bore 180 and the first bores 178 to internally, fluidly connect the first bore 178 and the third bores 180. The central bore 182 is sealed at the bottom surface, so that when the spool member 166 is disposed within the spool bore 164, the first volume 172 and the third volume 176 are fluidly connected and sealed on the top and bottom thereof, and the second volume 173 is sealingly isolated.

With the single-piece housing form illustrated in the figures, the passageways and chambers of the hydraulic components are bored into the housing 102. As such, some of the passageways and chambers are open to the front surface 152 of the housing 102. In order to contain the hydraulic fluid 134 within the housing 102, a cover or diaphragm 210 is mounted to cover the housing front surface 152 to thereby sealingly close any open passageways or chambers.

The housing 102 includes a concavely arcuate bottom right corner portion 186 (FIG. 6) along the bottom surface 158 thereof. Preferably, the arcuate corner portion 186 has a radius of curvature equal to or slightly greater than a largest path of rotation of the cam 108, or the bearing 112 mounted thereto (i.e., the path of rotation corresponding to the edge having the largest spacing from the cam bore 110). The piston pump chamber 124 is bored into this corner portion 186 through the bottom surface 154 so that the pump piston member 126 can be driven partially out of the chamber 124 and into a path of rotation of the cam 108. With this configuration, the cam 108 can pass closely adjacent to the housing 102 with rotation of the shaft 28 to impact and drive the piston member 126 of the piston pump 122 without undesirably contacting the housing 102.

Turning now to details of the pump piston member 126, which includes the end portion 132 and a generally cylindrical top portion 188. The end portion 132 is preferably rounded, such as having a dome-shape, so as to minimize friction and potential wear caused by the cam 108 repeatedly impacting the piston member 126 during operation of the hydraulic braking apparatus 100. The piston member top portion 188 includes a pair of transverse annular grooves 190 therearound, one adjacent to the end portion 132 and the other closely adjacent to a top surface 192 of the piston member 126. The grooves 190 are sized and configured to receive o-rings 194 therein. The o-rings 194 and piston member 126 are sized to sealingly engage the chamber 124 so that the hydraulic fluid is restricted from leaking or otherwise passing between the o-ring 194 and the pump chamber 124. Preferably, a side surface 196 of the piston member 126 between the grooves 190 is recessed with respect thereto or is at least partially concave so that there is a volume 200 between the piston side surface 196 and the pump chamber 124 to receive the hydraulic fluid therein.

As discussed above, the pump chamber 124 includes the outlet 135 and the inlet 136 to fluidly connect the pump 122 to the other brake components. Referring now to FIG. 6, the outlet 135 is a bore that extends from an end portion 198 of the pump chamber 124. In the illustrated form, the outlet 135 extends along the longitudinal axis of the chamber 124.

A check valve passageway 202 extends from an opening 204 in the housing front surface 152 to fluidly connect to the pump outlet 135. At the front surface 152, the check valve passageway 202 includes a chamber 206 having a relatively wider diameter than the adjacent portion of the passageway 202 to create a shoulder 208 for reception of the outlet check valve 138. The check valve chamber 206 is sized to tightly receive, such as in a friction fit, the check valve 138 therein so that the hydraulic fluid driven from the piston pump 122 cannot bypass the check valve 138. In the illustrated single housing form, the check valve cavity 202 is bored into the housing front surface 152.

A recessed pump outlet-spool channel 212 in the housing front surface 152 connects the check valve cavity opening 204 with an opening 214 of a pump outlet-spool passageway 216. An opposite opening 217 of the pump outlet-spool passageway 216 opens to the spool bore 164. With the cover 210 tightly secured against the housing front surface 152, the channel 212 is water tight, and, as such, all of the hydraulic fluid driven by the piston pump 122 through the check valve 138 is driven into the pump outlet-spool passageway 216 and into the spool bore 164. Operational details of the spool valve 162 will be discussed in greater detail below. If desired, the channel 212 can include a wall 218 extending away from the housing front surface 152 around its perimeter. With this configuration, the cover 210 will deform over the wall 218 to provide additional sealing area and protection against leaks.

Turning back to the piston pump 122, the pump inlet 136 extends from an opening 220 in the housing front surface 152 to intersect the pump chamber 124 intermediate of the housing bottom surface 158 and the chamber end portion 198. Specifically, the pump inlet 136 opens to the pump chamber 124 to fluidly connect to the inlet volume 200, discussed above, corresponding to the area between the member side surface 196 between the o-rings 194. A recessed pump inlet-spool channel 222 in the housing front surface 152 connects the pump inlet 136 with an opening 224 of a pump inlet-spool passageway 226. An opposite opening 228 of the pump-inlet spool passageway 226 opens to the spool bore 164. As such, the pump inlet 136 is fluidly connected to the spool valve 162. If desired, the channel 222 can include a wall 230 extending away from the housing front surface 152 around its perimeter. With this configuration, the cover 210 will deform over the wall 230 to provide additional sealing area and protection against leaks.

Additionally, the piston member 126 includes a longitudinal central cavity 232 that opens at the piston member top surface 192, and, thus, to the pump outlet 135. A bore 234 extends through the piston member 126 in a direction transverse to the pump longitudinal axis and opens to the piston member side surface 196 between the grooves 190 to the inlet volume 200. The bore 234 also intersects the central cavity 232 so that the bore 234 fluidly connects the inlet volume 200 with the central cavity 232, and therefore, the pump inlet 136 and outlet 135. Accordingly, the pump inlet 136 and outlet 135 are fluidly connected both within the pump 122 and through the spool valve 162.

The central cavity 232 further includes a check valve chamber 236 having a diameter larger than a downstream portion of the central cavity 232 to create a shoulder 238 for reception of the check valve 138. Preferably, the chamber 236 has a diameter sized to tightly receive the check valve 138 therein, such as in a friction fit, to allow fluid flow from the inlet 136 to the outlet 135, but to restrict fluid flow from the outlet 135 to the inlet 136.

Figure 4:
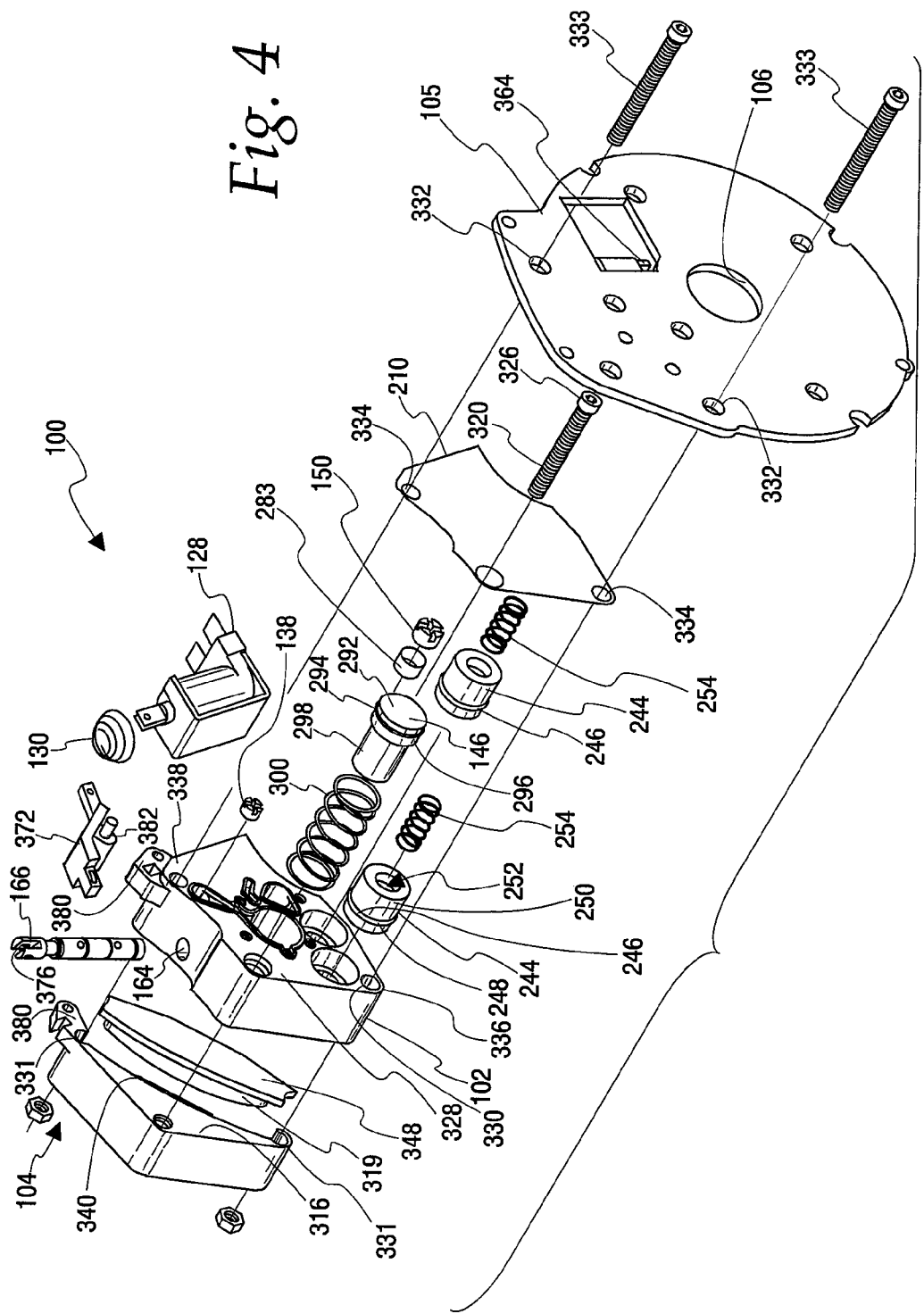
FIG. 4 is an exploded view of an example hydraulic braking apparatus according to various embodiments of the invention.
Figure 5:
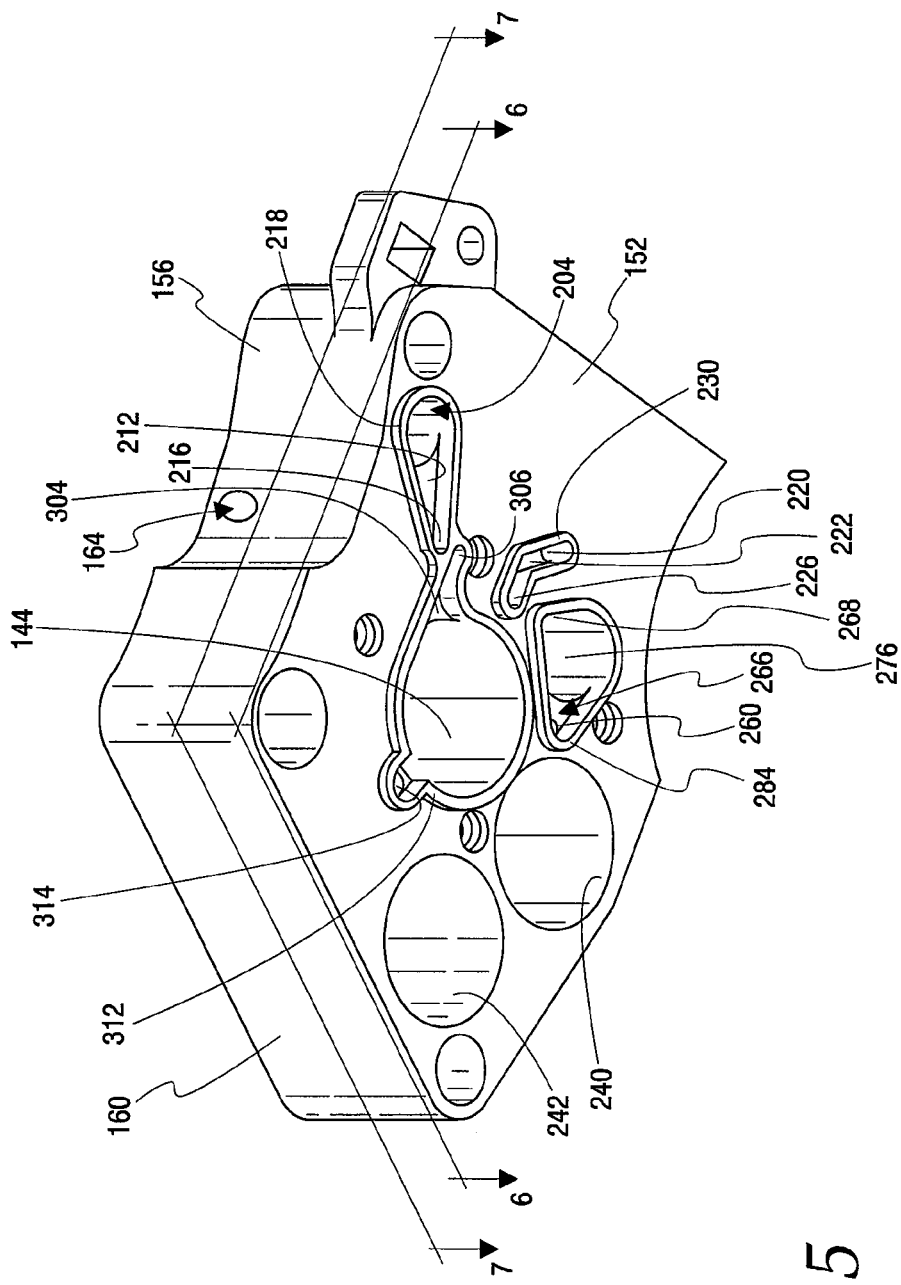
FIG. 5 is a perspective view of a hydraulic housing for the hydraulic braking apparatus of FIG. 4.

Turning now to details of the reservoir/accumulator 148, as shown in FIGS. 4-6. In the illustrated form, the reservoir 148 includes first and second cylinders 240, 242 bored into the housing 102 through the front surface 152 thereof. If desired or required by a particular application, an alternative number of cylinders can be used, such as one cylinder, three cylinders, or more. Each cylinder 240, 242 is sized to slidingly receive a cylindrical cap 244 therein. Each cap 244 includes an annular groove 246 extending transversely therearound configured to receive an o-ring 248 therein. The groove 246 and o-ring 248 are sized to sealingly engage each cylinder 240, 242 so that hydraulic fluid 134 disposed in the reservoir 148 does not leak around the cap 244. A front end portion 250 of each cap 244 includes a recess 252, which can preferably be generally cylindrical as shown, sized to partially receive a spring 254. The spring 254 biases the cap 244 towards a rear surface 256 of the cylinder 240, 242. Thus, as the hydraulic fluid 134 is forced into the reservoir 148, the fluid 134 presses against the cap 244 and the cap 244 is driven toward the housing front surface 152 deforming the spring 254. So configured, pressure can be stored in the reservoir in the form of the depressed spring 254.

In order to receive the hydraulic fluid 134 to store excess pressure in the hydraulic system, the reservoir 148 is fluidly connected to the pressure relief valve 150 and the spool valve 162. The first and second cylinders 240, 242 are fluidly connected by a passage 258 adjacent to the rear surface 256 thereof opposite of the housing front surface 152. A reservoir passageway 260 has an opening 262 in the housing front surface 152 and is bored adjacent to the first cylinder 240 to a depth generally equal to the cylinders 240, 242. A second passage 264 adjacent to the cylinder rear surface 256 fluidly connects the first cylinder 240 to the reservoir passageway 246.

A recessed portion 266 in the housing front surface 152 fluidly connects the reservoir 148, the spool valve 162, and the pressure relief valve 150, as shown in FIG. 5. A reservoir-spool passageway 268 includes an opening 270 in the housing front surface 152 and extends to an opening 272 to the spool bore 164. A pressure valve passageway 274 also has an opening 276 in the housing front surface 152 and an opening 278 to the spool bore 164. The pressure valve passageway 274 further includes a pressure valve cavity 280 adjacent to the housing front surface 152 having a diameter greater than an adjacent portion thereof forming a shoulder 282 for reception of the pressure valve 150. If required for a particular pressure valve and as shown in FIG. 4, the cavity 280 can be sized to tightly receive a pressure valve housing 283 therein, such as in a friction fit. The pressure valve housing 283 can then be configured to receive and house the pressure valve 150 therein. As shown, the reservoir passageway opening 262, the reservoir-spool passageway opening 270, and the pressure valve passageway opening 276 are all located within the recessed portion 266, and, as such, the recessed portion 266 fluidly connects the components with the cover 210 mounted to the housing 102. If desired, the recessed portion 266 can include a wall 284 extending away from the housing front surface 152 around its perimeter. With this configuration, the cover 210 will deform over the wall 284 to provide additional sealing area and protection against leaks.

Turning now to more details of the caliper piston 140, as shown in FIGS. 4-7 and 10. The caliper piston chamber 144 includes an opening 286 in the housing front surface 152 and an opening 288 in the housing rear surface 154 so that the chamber 144 extends through the housing 102. The rear opening 288 has a relatively smaller diameter than the rest of the chamber 144 so that the chamber 144 includes a shoulder 290 extending around the rear opening 288. The caliper piston member 146 shown in FIG. 4 includes a front cylindrical portion 292 with an annular groove 294 extending transversely therearound configured to receive an o-ring 296. The front portion 292 and the o-ring 296 are sized to sealingly engage the chamber 144 so that hydraulic fluid 134 is restricted from leaking therearound. The piston member 146 further includes a rear cylindrical portion 298 having a relatively smaller diameter than the front portion 292 sized to pass through the rear opening 288. The caliper piston 140 utilizes a spring 300 that is configured and sized to fit around the piston member rear portion 298. When the piston member 146 is disposed within the chamber 144, the spring 300 abuts a shoulder 302 of the piston member front portion 292 adjacent to the rear portion 298 and the shoulder 290 adjacent to the rear opening 288 to bias the piston member 146 away from the housing rear surface 154 and the opening 288 therein.

A recessed caliper channel 304 in the housing front surface 152 fluidly connects the caliper piston 140 to a caliper-spool passageway 306 having an opening 308 in the housing front surface 152 and an opening 310 to the spool bore 164. If desired, the caliper channel 304 can include a wall 312 extending away from the housing front surface 152 around its perimeter. With this configuration, the cover 210 will deform over the wall 312 to provide additional sealing area and protection against leaks. The caliper piston 140 can additionally include a storage or overflow chamber 314 bored into the housing front surface 152 that opens within the recessed caliper channel 304. In this configuration, the wall 312 would additionally extend around the chamber 314. The storage chamber 314 is sized to receive excess hydraulic fluid therein during operation of the hydraulic system.

Operation of the spool valve 162 will now be described with respect to FIGS. 8 and 9. The spool valve 162 operates by sliding the spool member 166 within the bore 164 between an off position shown in FIG. 8 and an operative position shown in FIG. 9. The pump outlet-spool passageway 216 and the caliper-spool passageway 306 connect to the spool bore 164 in a vertically stacked orientation closely adjacent to one another and adjacent to the housing top surface 156. These passageways 216, 306 are configured to fluidly connect with the spool first volume 171 in both the operative position and the off position. As such, the pump outlet 135 and the caliper piston 140 are continuously fluidly connected. Accordingly, if desired, the pump outlet 135 and the caliper piston 140 could share a single spool passageway and a recessed front housing channel configured similarly as discussed above if desired. The pump inlet-spool passageway 226 connects to the spool bore 164 so as to be fluidly connected with the spool second volume 173 in both the operative position and the off position, while the pressure valve passageway 274 connects to the spool bore 164 so as to be fluidly connected with the spool third volume 175 in both the operative position and the off position. Finally, the reservoir-spool passageway 268 connects to the spool bore 164 intermediate of and spaced from the pump inlet-spool passageway 226 and the pressure valve passageway 274. So configured, in the operative position, the reservoir-spool passageway 268 is fluidly connected to the pump inlet-spool passageway 226 through the second spool volume 173, and, in the off position, is fluidly connected to the reservoir-spool passageway 268 through the spool third volume 175. Additionally, as discussed above, the spool first and third volumes 172 and 176 are fluidly connected through the spool bores 178, 180, 182.

With this configuration, when the hydraulic braking apparatus 100 is disengaged with the spool member 166 in the off position, pressure built up within the system is transferred to the reservoir 148 to be stored thereby, as discussed above, and the pump inlet 136 is isolated from pressure stored within the system by being isolated in the spool second volume 173. Then, when braking is desired, the spool member 166 is shifted downward so that the reservoir-spool passageway 268 transfers from the spool third volume 175 to the spool second volume 173. This allows reservoir pressure to transfer fluid stored within the reservoir 148 to the pump inlet 136 and through the check valve 138 to above the pump piston member 126. This pressure drives the pump piston member 126 to the extended position to be subsequently driven by the cam 106 to the compressed position. When the cam 106 drives the pump piston member 126 to the compressed position, the hydraulic fluid is driven through the pump outlet 135 and the spool valve 162 to overcome the spring 300 biasing force and drive the caliper piston member 146 rearwardly so that the rear portion 298 thereof is driven through the rear opening 288. By fluid connection through the spool valve 162, excess pressure can vent through the pressure relief valve 150, which, by virtue of the recessed portion 266 transfers fluid to the reservoir 148 and, if the spool valve 162 is in the operational position, back to the pump inlet 136 to again drive the pump piston member 126 to the extended position.

The hydraulic braking apparatus 100 can be pre-charged during manufacture, to a pressure range of about 30 pounds per square inch (psi) to about 50 psi, although other pressures can be used. The pre-charge can be utilized to start operation of the hydraulic braking apparatus 100 without prior engagement of the piston pump 122 with the cam 108, which allows the hydraulic braking apparatus 100 to statically hold against rotation of the shaft 28. The braking force required to statically hold the movable barrier 16 in a stopped position is much lower than the braking force required to dynamically stop rotation of the shaft 28. As discussed above, dynamic braking is achieved with the cam 108 engaging the piston pump 122. The pressure generated within the hydraulic braking apparatus continues to build up with repeated piston pump operational cycles and as the shaft 28 rotates during its slowing down. If the pressure exceeds a threshold pressure, the pressure relief valve 150 can vent the excess pressure to the reservoir 148 to keep the maximum pressure at a reasonable level, such as about 300 psi to about 500 psi for the illustrated example.

Figure 10:
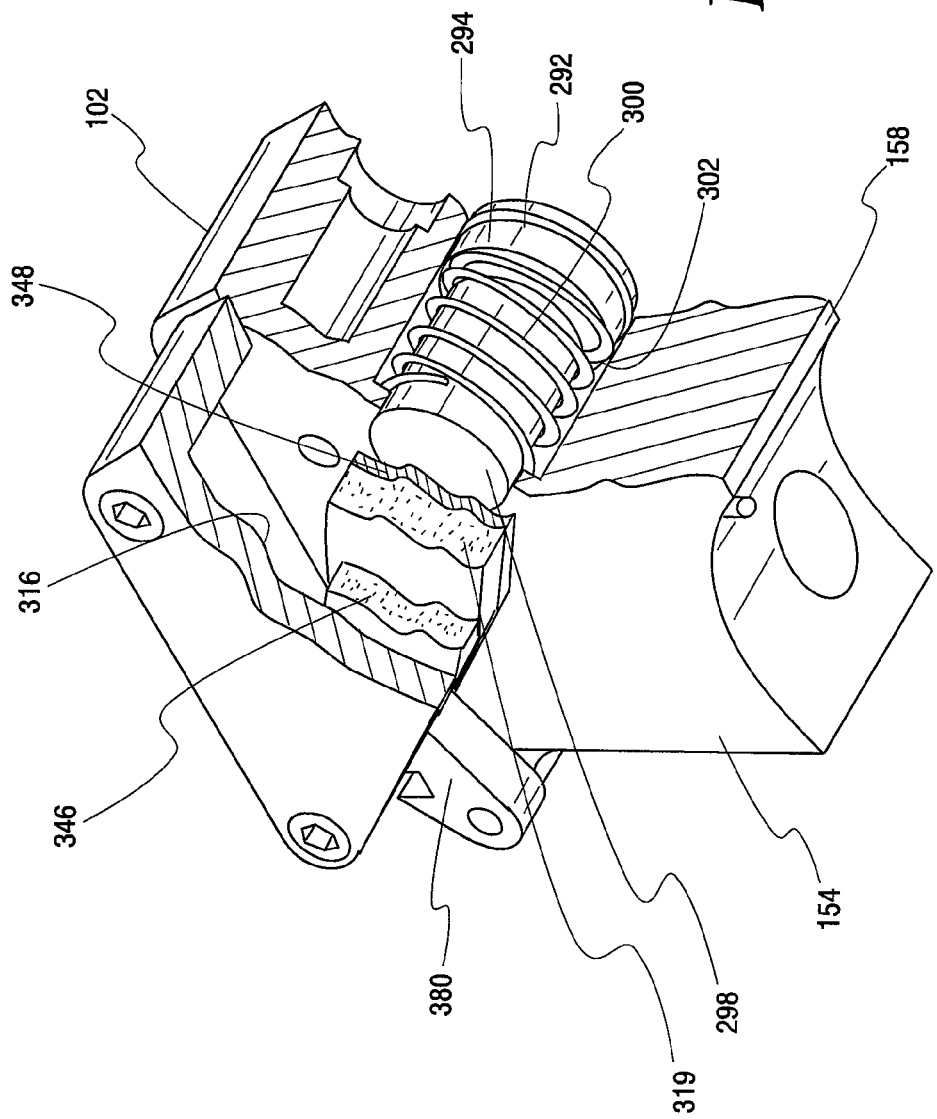
FIG. 10 is a cutaway view of a caliper piston and brake caliper device for the hydraulic braking apparatus of FIG. 4.

The brake caliper device 104 will now be described with respect to FIGS. 4 and 10. The brake caliper 104 includes front and rear surfaces 316, 318 and mounts to the housing 102 so that the caliper front surface 316 abuts the housing rear surface 154. The brake caliper 104 includes a pair of brake pads 319 that are configured to impede rotation of the shaft 28.

In the illustrated form, the brake caliper 104 is secured with a screw or bolt 320 inserted through a threaded bore 322 extending through the housing front and rear surfaces 152, 154 and into the brake caliper 104 through the front surface 316 thereof. To keep the housing front surface 152 flush, a front portion 324 of the bore 320 can have a relatively larger diameter so that an end portion 326 of the bolt 320 configured to be turned by a suitable tool can be received within the bore front portion 324. In the illustrated form, the bore 322 is positioned in an upper left corner portion 328 of the housing 102 spaced from the hydraulic components and passageways therein.

As discussed above, the housing 102 and the brake caliper 104 secured thereto are configured to be mounted to the bracket 105, as shown in FIG. 2. Pursuant to this, the housing 102 and the brake caliper 104 include bores 330 and 331 therethrough extending from the housing front surface 152 to the caliper rear surface 318. The bores 330 and 331 align with an opening 332 in the bracket 105 and an opening 334 in the cover 210 to receive screws or bolts 333 therethrough. As such, the housing 102 and the brake caliper 104 can be tightly secured against the bracket 105 with the cover 210 therebetween. Preferably, the housing 102 is secured tightly enough so that the cover 210 seals the various recessed portions of the housing front surface 152 against leakage. With the housing 102 mounted to the bracket 105, the springs 254 of the reservoir 148 abut the cover 210 and the bracket 105 underneath to bias the caps 244 rearwardly in the reservoir cylinders 240, 242 to pre-pressurize the system. In the illustrated form, the bores 330 are positioned in a lower left corner portion 336 and an upper right corner portion 338 of the housing 102 respectively.

The brake caliper 104 includes a recessed portion 340 in the front surface 316 and onto a radially inward side 341 thereof. The recessed portion 340 is sized so that the bores 330 are positioned at ends 342 thereof. A forwardly facing surface 344 of the recessed portion 340 has one of the brake pads 319 secured thereto, such as with a suitable adhesive, hardware, or the like. Additionally, the brake caliper 104 includes a free-floating brake pad member 346 that includes the other brake pad 319 secured to a rigid backing plate 348. An interior edge 350 of the backing plate 348 abuts and is substantially complementary to an interior surface 352 of the recessed portion 340 so that the backing plate 348 can be smoothly shifted therealong. An opposite outer edge 354 of the backing plate 348 generally aligns with outer edges 356 of the brake pads 319, so that the brake pads 319 are substantially aligned in a front to back relation. The brake pads 319 can preferably have a generally identical shape and configuration. As shown, concave end portions 358 of the backing plate 348 are configured to extend partially around the bolts 333 received in the bores 330 so that with the brake caliper 104 mounted to the housing 102 and both secured to the bracket 105, the brake pad member 346 is secured within the caliper recessed portion 340.

The brake caliper 104 is mounted to the housing 102 with the recessed portion 340 and the brake pad member 348 therein being aligned rearwardly of the rear opening 288 of the caliper piston 140. So configured, when the caliper piston member 146 is driven rearwardly, the rear portion 298 is free to pass through the rear opening 288 and to abut the brake pad member 346 thereby shifting the brake pads 319 together to impede rotation of the shaft 28. If desired, the brake pad member 348 can be secured to the caliper piston member 146, such as by hardware, welding, or the like, so that the biasing force of the spring 300 pulls the brake pad member 348 away from the other brake pad 319 when the hydraulic braking apparatus 100 is off. This would additionally restrict the travel of the caliper piston member 146 within the cylinder 144 despite the biasing force of the spring 300.

As shown in FIG. 2, a circular rotor 360 is mounted to the shaft 28 to rotate with the shaft 28. The rotor 360 has a diameter sized to extend into the recessed portion 340 of the brake caliper 104 between the brake pads 319. So configured, the caliper piston 140 can drive the brake pads 319 together that then frictionally engage main surfaces 362 of the rotor 360 to thereby impede rotation of the shaft 28.

Turning again to control of the hydraulic braking apparatus 100, the bracket 105 includes a tab 364 that is turned to be positioned adjacent to the right side surface 160 of the housing 102 and is configured to have the solenoid 128 mounted thereto, such as with a solenoid mounting bracket 365. The solenoid 128 includes a shifting mechanism 366 that shifts a bracket 368 vertically between a first lower position and a second higher position. The solenoid bracket 368 is configured to rotatably couple to a first end 370 of an arm 372. The arm 372 extends over the housing 102 to a second end 374 thereof that is configured to rotatably couple to an upper bracket 376 of the spool member 166. A pivot 378, such as a rod 382 extending between projections 380 on the housing 102 and the brake caliper 104, extends through a transverse bore in the arm 372, so that when the shifting mechanism 366 is in the lower position, the arm 372 holds the spool member 166 in the vertically higher off position. Then when operation of the hydraulic braking apparatus is desired, the solenoid shifts the shifting mechanism 366 to the higher position so that the arm second end 374 pivots downwardly to shift the spool member 166 downward to the operative position.

To protect against undesirable rotation of the shaft 28 in a case of a loss of power to the solenoid 128, the return spring 130 can be mounted between the arm 372 and an upper surface 384 of the solenoid 128 (or the solenoid mounting bracket 365) in a depressed state. As such, when power is lost and the solenoid 128 loses control of pivoting the arm 374, the spring 130 can force the arm 372 upward to engage the hydraulic brake apparatus and thereby impede rotation of the shaft 28.

As shown in FIG. 2, the hydraulic braking apparatus 100 as described above, mounted to the bracket 105 can be mounted within the movable barrier operator 24 so that the cam 108 and the rotor 360 are mounted to a shaft 386 of a motor 388 therein. In a preferred form, the motor 388 is an electric motor. Alternatively, the hydraulic braking apparatus 100 can be packaged as a part of a kit to be offered for sale, that is configured to be assembled and mounted to the substrate 12 adjacent to the movable barrier opening 14. As such, the hydraulic braking apparatus 100 can then be mounted so that the cam 108 and the rotor 360 are mounted to the drive shaft 28 of the movable barrier 16.

As known in the art, movable barrier operators can have travel limits stored, such as in a memory therein, that correspond to open and closed positions of the movable barrier 16. Then, when the movable barrier reaches these limits during travel, a signal is generated. Additionally, as known in the art, movable barrier operators can be configured to be responsive to signals transmitted from a transmitter 390 (FIG. 1) to a receiver 392 in the operator, such as signals having codes matched in a memory of the operator, or signals transmitted from a wall mounted switch device 394 (FIG. 1), having either a wireless or wired connection. The movable barrier operator 24 can also include a sensing device 396 as known in the art configured to sense movement of the movable barrier 16 when the motor 388 is not operational. This state can indicate that the movable barrier 16 is uncontrollably falling to a closed position. In this instance, the sensing device 396 can be configured to generate a control signal indicating such undesirable movement. Accordingly, the movable barrier operator 24 can include a processing or control device 398 configured to control operation of the movable barrier operator 24 in response to receiving signals as set forth above and cause the hydraulic braking apparatus 100 to become operational to impede movement of the shaft 28 or 386 by sending a control signal to the solenoid 128 to shift the shifting mechanism 366 to the higher position. Alternatively, the kit of the hydraulic braking apparatus 100 can include a separate processing or control device 399 configured to similarly send control signals to the solenoid 128.

With the structure described above, methods for operation and installation of the hydraulic braking apparatus 100 will be described below. In a first example, a method 400 for operating the hydraulic braking apparatus 100 is shown in FIG. 11. The method 400 includes converting 402 rotational movement of the drive or motor shaft 28, 386 into linear movement of the pump piston member 126 within the piston pump 122. This can occur by the pump piston member 126 engaging the cam 108 mounted to the shaft 28, 386. As discussed above, the pump piston member 126 can engage the cam 108 as a result of operation of the spool valve 162, such as by shifting the spool member 166 to the operative position. The pump piston member 126 can also engage the cam 108 by initially pressurizing the reservoir 148 and releasing pressure within the reservoir into the piston pump 122 to drive the pump piston member 126 to the extended position. Operation of the piston pump 122 creates 404 pressure within the hydraulic lines fluidly connected to the piston pump 122. With this pressure, the brake pad 319 is driven 406 into frictional engagement with the brake member 360 coupled to the shaft 28, 386.

One example method of installing 500 the hydraulic braking apparatus 100 is illustrated in the flow chart shown in FIG. 12. The installation includes coupling 502 the cam 108 to the drive or motor shaft 28, 386 coupled to the movable barrier 16. The piston pump 122 is mounted 504 adjacent to the shaft 28, 386 so that the piston pump 122 can selectively engage the cam 108. A brake member 360 is also coupled 506 to the shaft 28, 386. The installation next includes mounting 508 the brake caliper assembly 104 with the brake pads 319, as described above, adjacent to the brake member 360 so that the brake pads 319 can selectively engage the brake member 360. The brake piston mechanism 140 is mounted 510 adjacent to the brake caliper assembly 104 so that the brake piston mechanism 140 can selectively shift the brake pad 319 into engagement with the brake member 360. Hydraulic lines, such as those discussed above, are then established 512 between the piston pump 122 and the brake piston mechanism 140. Additionally, the installation 500 can optionally include operatively coupling 514 the control device 398, 399 to the piston pump 122 so that the control device 398, 399 can control the selective engagement between the piston pump 122 and the cam 108.

Those skilled in the art will recognize that a wide variety of modifications, alternations, and combinations can be made with respect to the above described embodiments without departing from the scope of the invention. For instance, although configurations, shapes, and sizes for a hydraulic braking apparatus have been described, other suitable configurations, shapes, and sizes could also be utilized to achieve the desired braking application. Such modifications, alternations, and combinations are to be viewed as being within the ambit of the inventive concept.

What is claimed is:

1. A hydraulic movable barrier brake apparatus comprising:
   a cam coupled to a drive shaft of a movable barrier operator configured to control operation of a movable barrier;
   a first piston mechanism configured to selectively engage the cam; and
   a brake mechanism operatively coupled to the first piston mechanism and configured to impede rotation of the drive shaft through driving a brake caliper in response to the first piston mechanism engaging the cam.

2. The hydraulic movable barrier brake apparatus of claim 1 further comprising a control device configured to control operation of the first piston mechanism.

3. The hydraulic movable barrier brake apparatus of claim 2 further comprising a fluid reservoir fluidly connected to the first piston mechanism and configured to pressurize in response to the control mechanism causing the first piston mechanism to disengage from the cam.

4. The hydraulic movable barrier brake apparatus of claim 3 further comprising a second piston mechanism fluidly coupled to the first piston mechanism and configured to cause the brake mechanism to impede rotation of the drive shaft in response to operation of the first piston mechanism.

5. The hydraulic movable barrier brake apparatus of claim 4 wherein the first piston mechanism, the second piston mechanism, and the fluid reservoir are hydraulically coupled by fluid lines, and wherein the fluid lines are defined by a single-piece housing.

6. The hydraulic movable barrier brake apparatus of claim 5 further comprising a spool member disposed at least partially within the single-piece housing and movable between on and off positions controlling a plurality of fluid connections between the first piston mechanism, the second piston mechanism, and the fluid reservoir.

7. The hydraulic movable barrier brake apparatus of claim 3 wherein the fluid reservoir is configured to at least partially drive the first piston mechanism to an extended position to thereby engage the cam and be driven by the cam to a compressed position.

8. The hydraulic movable barrier brake apparatus of claim 3 wherein the fluid reservoir includes a pre-charge pressure between about 30 psi and about 50 psi.

9. The hydraulic movable barrier brake apparatus of claim 2 further comprising a return spring configured to drive the first piston mechanism to an extended position to thereby engage the cam and be driven the cam to a compressed position.

10. The hydraulic movable barrier brake apparatus of claim 9 wherein the return spring is configured to drive the first piston mechanism to the extended position in response to a loss of power to the control device.

11. The hydraulic movable barrier brake apparatus of claim 2 wherein the control mechanism comprises a solenoid.

12. The hydraulic movable barrier brake apparatus of claim 2 wherein the control mechanism is configured to:
   receive a signal indicating that the movable barrier traveled to a movement limit; and
   cause the first piston mechanism to engage the cam in response to receiving the signal indicating that the movable barrier traveled to the movement limit.

13. The hydraulic movable barrier brake apparatus of claim 2 wherein the control mechanism is configured to cause the first piston mechanism to engage the cam in response to movement of the movable barrier without operation of the movable barrier operator.

14. The hydraulic movable barrier brake apparatus of claim 1 wherein the brake mechanism comprises:
   a rotor member coupled to the drive shaft; and
   at least one brake pad positioned adjacent to the rotor member and configured to engage the rotor member to impede rotation of the drive shaft in response to operation of the first piston mechanism.

15. A movable barrier operator comprising:
   a housing;
   a movable barrier motor at least partially received within the housing, the movable barrier motor having a motor shaft and being configured to drive a movable barrier between and open and closed positions;
   a hydraulic brake configured to selectively engage the motor shaft to thereby inhibit rotation of the motor shaft and movement of the movable barrier, wherein the hydraulic brake assembly comprises:
      a cam coupled to a drive shaft of a movable barrier operator configured to control operation of a movable barrier;
      a first piston mechanism configured to selectively engage the cam; and
      a brake mechanism operatively coupled to the first piston mechanism and configured to impede rotation of the drive shaft through driving a brake caliper in response to the first piston mechanism engaging the cam.

16. The movable barrier operator of claim 15 wherein the the brake mechanism comprises a brake pad and a rotor coupled to the motor shaft, the brake pad configured to engage and impede rotation of the rotor in response to the first piston mechanism engaging the cam.

17. The movable barrier operator of claim 16 wherein the hydraulic brake assembly further comprises a second piston mechanism connected between the first piston mechanism and the brake mechanism such that operation of the first piston mechanism drives operation of the second piston mechanism and the second piston mechanism drives the brake pad into engagement with the rotor.

18. The movable barrier operator of claim 15 further comprising a control device configured to control operation of the motor and the hydraulic brake assembly.

19. The movable barrier operator of claim 18 wherein the control device comprises a solenoid configured to selectively cause the first piston mechanism to engage the cam.

20. The movable barrier operator of claim 15 further comprising a fluid reservoir having a cylinder disposed within the housing and configured to receive hydraulic fluid in response to the first piston mechanism disengaging from the cam.

21. The movable barrier operator of claim 15 further comprising a return spring configured to cause the first piston mechanism to engage the cam and impede rotation of the motor shaft in response to a loss of power.

22. A hydraulic movable barrier brake apparatus comprising:
- a cam coupled to a drive shaft of a movable barrier operator configured to control operation of a movable barrier;
- a first piston mechanism configured to selectively engage the cam;
- a brake mechanism operatively coupled to the first piston mechanism and configured to impede rotation of the drive shaft in response to the first piston mechanism engaging the cam;
- a fluid reservoir fluidly connected to the first piston mechanism and configured to pressurize in response to the control mechanism causing the first piston mechanism to disengage from the cam;
- a second piston mechanism fluidly coupled to the first piston mechanism and configured to cause the brake mechanism to impede rotation of the drive shaft in response to operation of the first piston mechanism;
- a housing defining fluid lines hydraulically coupled to the first piston mechanism, the second piston mechanism, and the fluid reservoir;
- a spool member disposed at least partially within the housing and movable between on and off positions that selectively control a plurality of fluid connections among the first piston mechanism, the second piston mechanism, and the fluid reservoir.

23. The hydraulic movable barrier brake apparatus of claim 22 wherein the brake mechanism comprises a brake pad and a rotor coupled to the motor shaft, the brake pad configured to engage and impede rotation of the rotor in response to the first piston mechanism engaging the cam.

24. The hydraulic movable barrier brake apparatus of claim 22 further comprising a control device configured to control operation of the hydraulic brake assembly by effecting selective movement of the spool member.

25. The hydraulic movable barrier brake apparatus of claim 22 further comprising a fluid reservoir having a cylinder disposed within the housing and configured to receive hydraulic fluid in response to the first piston mechanism disengaging from the cam.

26. The hydraulic movable barrier brake apparatus of claim 22 further comprising a return spring configured to cause the first piston mechanism to engage the cam and impede rotation of the motor shaft in response to a loss of power.

27. The hydraulic movable barrier brake apparatus of claim 22 wherein when disposed in the off position, the spool member effects a connection of the fluid lines to fluidly disconnect a fluid pump from the fluid reservoir and to fluidly connect the fluid reservoir to a pressure relief.

28. The hydraulic movable barrier brake apparatus of claim 22 wherein when disposed in the on position, the spool member effects a connection of the fluid lines to fluidly connect a fluid pump to the fluid reservoir and to fluidly disconnect the fluid reservoir from a pressure relief.

* * * * *